3,100,244
Patented Aug. 6, 1963

3,100,244
INTER-COMMUNICATION SYSTEMS

Daniel Lawrence King, London, and Eric Gibbon Hitch, Enfield, England, assignors to Associated Electrical Industries Limited, London, England, a British company Filed Nov. 17, 1960, Ser. No. 72,542
Claims priority, application Great Britain Nov. 26, 1959
7 Claims. (Cl. 179—17)

Figures 1, 2:
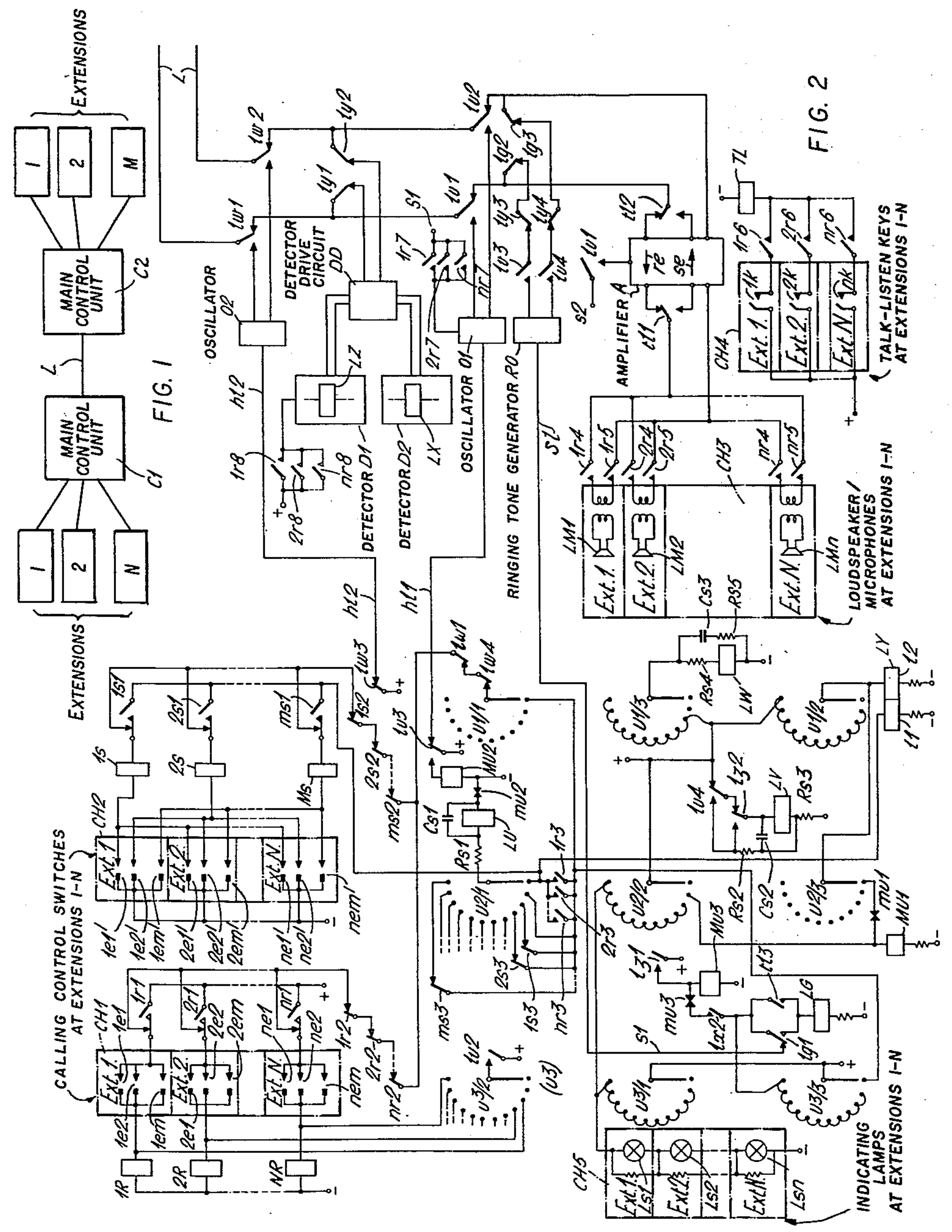

This invention relates to inter-communication systems and more particularly to a system in which any one of a number of extension equipments at one end of a communication path can obtain connection over such path to any one of the same or a different number of extension equipments at the other end of the path.

According to the invention there is provided for such a system, in respect of an end of the communication path, apparatus comprising: a plurality of first switching means pertaining one to each of the extensions at said end and each operable to afford its extension access to the communication path to the exclusion of all other extensions at the same end; pulse generating means operable to apply a pulse train to the communication path consequent on operation of a first switching means pertaining to a calling extension at this end; a plurality of second switching means pertaining one to each extension at the other end of the path and each operable, contemporaneously with operation of a first switching means when the extension to which such second switching means pertains is being called by the extension to which the operated first switching means pertains, the number of pulses in a pulse train applied to the communication path by the pulse generating means being determined, according to a particular extension being called, by the operation of the second switching means pertaining to the called extension; and selecting means which, in accordance with the number of pulses in a pulse train received over the communication path, this number identifying a particular extension being called by a calling extension at the other end, selectively causes operation of the particular first switching means pertaining to the called extension. It is contemplated that similar apparatus would be provided for the other end of the communication path also.

The operation of the apparatus is then that when an extension at either end of the communication path initiates a call, it brings about at its own end of the path the operation of the particular first switching means which pertains to that extension and also the operation of the particular second switching means which pertains to the extension being called at the other end of the communication path. The first switching means, upon operation, affords the calling extension access to the communication path to the exclusion of the other extensions at the same end of the path itself, and also initiates operation of the pulse generating means at that end. The second switching means, upon operation, controls this pulse generating means so that there is applied from it to the communication path a pulse train containing a number of pulses which identifies the extension being called. At the other, called, end of the communication path the selecting means in the apparatus there responds to these pulses and in accordance with their number brings about at this called end the operation of the first switching means pertaining to the called extension, thereby establishing interconnection between the calling and called extensions by giving the called extension access to the path to the exclusion of the other extensions at the called end.

The switching means referred to preferably include relays which are provided, together with the pulse generating means and the selecting means, in a main control unit for the relevant end of the communication path and are controlled from the individual extensions, when calling, by operation of push-button, key, or other calling switches provided at the extensions. Thus each extension may include a number of such calling switches respectively corresponding to the several extensions at the other end of the communication path, the operation of a particular calling switch at an extension being effective to establish, over control connections between the extensions and the main control unit, energizing circuits for respective relays relating in the main control unit to that particular extension and to the particular called extension to which the operated calling switch relates. The selecting means, in response to a received pulse train, may bring about in respect of a called extension the energization either of a separate relay relating to that extension, in which case the aforesaid first switching means pertaining to an extension comprises two relays therefor, or, preferably, of the same relay as is energized when that extension is calling.

In applying the invention to an inter-communication system providing speech communication between extensions on a broadcast basis in both directions, that is, audio reception is to be effected at the extensions by means of loudspeakers, it is contemplated that since only one extension is connected to each end of the communication path at any time, the ends of the path may be terminated at respective amplifying means to which all the extensions at the relevant end have common one-at-a-time access: this would avoid the need for providing individual amplifying means at each extension.

The common amplifying means thus provided at opposite ends of the communication path may each be used for both transmission and reception of intelligence, suitable switching being provided in conjunction with each amplifying means for controlling connection thereto according to the function required of it at any time. There may then be provided at each extension a single loudspeaker/microphone device which, when the extension has access to the amplifying means, can be switched under the control of the extension between input and output circuits of the amplifying means according as it is required to function either as a loudspeaker or as a microphone.

The pulse trains transmitted over the communication path to identify called extensions according to the number of pulses they contain, may be in the form of bursts of frequency tone, for which purpose there could be provided at each end of the communication path, a suitable oscillator associated with the pulse generating means and a suitable frequency tone detector associated with the selecting means.

In order that the invention may be more fully understood, reference will now be made to the accompanying drawings, of which FIG. 1 is a block schematic diagram of a telecommunication system in which communication can be established between any one of a number of extensions at one end of a communication path and any one of a number of extensions at the other end, and FIG. 2 is a circuit diagram of apparatus at one end of such communication path in a circuit embodying the invention, it being assumed that the apparatus at the other end is similar.

Referring to FIG. 1, a number of extensions 1–N at one end of a communication path L have access over this path to a number of extensions 1–N at the other end, and vice versa, the access being controlled by main control units C1 and C2. FIG. 2 shows the apparatus for extensions 1–N and control unit C1.

In FIG. 2 the circuit elements which are included in individual extension units have been shown in sub-divided chain-dotted rectangles the sub-divisions of each of which respectively relate to the several extension units. The remaining circuit elements are included in the main control unit (C1) provided at the relevant end of the communication path to serve in common the several extensions at 1–N at that end. As regards the circuit elements included in the extension units, these have been shown distributed among the circuit elements of the main control unit in a manner which enables interconnections to be shown without undue complication, no account being taken of the actual physical relationship of the elements. The sub-divisions of the chain-dotted rectangles have been labelled Ext. 1, Ext. 2, . . . Ext. N, according to the particular extensions to which each sub-division relates. For instance sub-division Ext. 1 of rectangle CH1 relates to extension 1, at which the contacts 1*e*1, 1*e*2 . . . 1*em* can be selectively operated, the prefixed numeral (1) denoting that these contacts belong to extension 1, and the suffixes (1 . . . *m*) denoting that they refer to the extensions (1–M) at the far end, as will be explained. Connections shown extending into or out of the rectangles referred to would in practice be afforded by multiwire connecting leads extending between the main control unit and the several extension units.

In general, each extension unit may be provided with a push-button switch panel having a plurality of push-button switches which are individually numbered to correspond to the extensions available at the far end of the communication path and which control calling switch contacts (shown in the chain-dotted rectangles CH1 and CH2) which in turn control certain relays in the main control unit. The push-button switch panel also includes a cancel button (not represented) which does not control any contacts but is mechanically coupled to the push-button switches, for instance by means of a locking bar, in such manner that a push-button switch, once operated, is locked in its operated condition until released by operation of the cancel button. Also included in each extension unit is a loudspeaker/microphone device, a talk/listen key and an indicating lamp which are represented in the drawings in the chain-dotted rectangles CH3, CH4 and CH5 respectively.

Referring now in detail to the drawings, the main control unit is located at one end of a communication path represented by a two-wire line L. The unit includes a number of "near-end" extension relays 1R, 2R, . . . NR (constituting the first switching means referred to previously) which pertain one to each of N extensions served by the main unit at that end, and a number of "far-end" extension relays 1S, 2S, . . . MS (Constituting the second switching means referred to previously) which pertain one to each of M extensions at the other end of the line L. In the near-end extension to which the relay 1R pertains, the push-button switches, numbered 1, 2, . . . M corresponding respectively to the (M) far-end extensions, control respective normally-open contacts 1*e*1, 1*e*2, . . . 1*em* (shown in the chain-dotted rectangle CH1) each of which is effective, when closed by operation of the relevant push-button switch, to complete an energizing circuit for the relay 1R as will be described, provided that the main control unit is not already in use: subject to this proviso, the relay 1R is therefore operated whenever any push-button switch is operated in the near-end extension to which it pertains. The push-button switches in this extension also control respective normally-open contacts 1*e*1′, 1*e*2′, . . . 1*em*′ (shown in the chain-dotted rectangle CH2) each of which is effective, when closed by operation of the relevant push-button and again provided that the main control unit is not in use, to complete an energizing circuit for the particular one of the relays 1S, 2S, . . . MS which pertains to the far-end extension to which the operated push-button switch corresponds. The push-button switches in the other near-end extensions, to which the relays 2R . . . NR respectively pertain, similarly control normally-open contacts 2*e*1, 2*e*2, . . . 2*em*; *ne*1, *ne*2, . . . *nem*, governing these relays and normally-open contacts 2*e*1′, 2*e*2′, . . . 2*em*′; *ne*1′, *ne*2′, . . . *nem*′ governing the relays 2S . . . MS. In consequence, whenever a near-end extension initiates a call to a far-end extension by operation of the relevant push-button switch, the (S) and (R) relays pertaining respectively to these extensions are operated.

The main control unit also includes: a first uniselector switch (U1) having three contact arcs U1/1, U1/2 and U1/3, a stepping electromagnet MU1, and interrupter contacts *mu*1; a second uniselector switch (U2) having three contact arcs U2/1, U2/2 and U2/3, a stepping electromagnet MU2, and interrupter contacts *mu*2; and a third uniselector switch (U3) having three contact arcs U3/1, U3/2 and U3/3, a stepping electromagnet MU3, and interrupter contacts *mu*3. Each of these contact arcs, for which there is an individual wiper, has a home contact which the wiper engages when its switch is in its normal, or home, position, and a plurality of off-normal contacts which the wiper successively engages during stepping of the switch.

The second uniselector switch (U2) forms with an impulsing relay LU, in conjunction with a tone oscillator O1 having a frequency of, say, 1 kc.s., the pulse generating means referred to previously. By means of contacts *lu*1, *lu*2 and *lu*3 of the relay LU, the oscillator O1 is rendered effective and connected to the wires of the line L each time the relay LU becomes operated over an energizing circuit completed through the contact arc U2/1; consequently a burst of 1 kc.s. frequency tone is transmitted over the line L on each operation of relay LU. The third uniselector switch (U3), in conjunction with a tone detector D1, forms the selecting means referred to previously. This detector D1 is designed to respond to 1 kc.s. frequency tone and controls, in correspondence with bursts of such tone received from the far end of the line L when an extension there is calling, the energization of a selecting relay LZ having a contact *lz*1 under control of which stepping of the third uniselector switch (U3) is effected. The off-normal position to which this latter switch becomes stepped determines the operation of the particular one of the relays 1R, 2R, . . . NR which pertains to a called extension, as will be described. The first uniselector switch (U1), in conjunction with a detector guard relay LY and a homing guard relay LW, performs certain guarding functions during restoration of the control arrangement to normal after use. The relay LW controls the operation of a second oscillator O2, having a frequency of, say, 2 kc.s., which is utilised as a releasing frequency tone, the oscillator O2 being rendered effective and connected to the wires of the line L by contacts *lw*1, *lw*2 and *lw*3 of the relay LW at times when this relay is operated. As will be described, the oscillator O2 is rendered operative, for release purposes, in the instance that the main control unit including it has been taken into use in respect of a calling extension.

The detector D1 and also a second detector D2, are fed, from a detector drive circuit DD, with frequency tone received over the line L, this drive circuit DD being connected to the wires of the line L by way of contacts *ly*1 and *ly*2 of the relay LY at times when the latter is unoperated. This second detector D2 is designed to respond to the 2 kc.s. releasing tone and controls, in response to receipt of such tone, the energization of a release relay LX by which restoration of the main unit to normal is initiated in the instance that it has been taken into use in respect of a called extension.

The extensions associated with the main control unit of the drawing have common access to an amplifier A at which the line wires of the line L terminate. Loudspeaker/microphone devices LM1, LM2, . . . LM*n* included at these extensions (rectangle CH3) are connectible to this amplifier A by means of normally-open contacts $1r4/1r5$, $2r4/2r5$, . . . $nr4/nr5$, respectively, of the appertaining relays 1R, 2R, . . . NR. In order to permit the amplifier A to be used for both transmission and reception of intelligence, a talk/listen relay TL is provided which controls changeover contacts $tl1$ and $tl2$ by which the input and output connections of the amplifier A can be interchanged in accordance with the function required of it at any time. As indicated by the arrows *re* and *se* representing the alternative senses of connection of the amplifier A, the amplifier is normally connected to receive intelligence signals incoming from the line L and is connected to transmit intelligence signals outgoing to the line L when the contacts $tl1$ and $tl2$ change over. The energization of the relay TL is controlled by talk/listen keys $1k$, $2k$, . . . $nk$ in the respective extension units, but in order that each such key shall be effectual only when its extension has use of the main control unit, that is, when the relevant one of the relays 1R, 2R, . . . NR is operated, a normally-open contact $1r6$, $2r6$, . . . $nr6$, as the case may be, of each of these relays is connected in series with the extension's talk/listen key.

There is also included in the main control unit a ringing tone generator R0, operation of which is initiated by the selecting relay LZ upon receipt by the detector D1 of the first burst of 1 kc.s. frequency tone received in from a calling extension at the far end of the line. The operation of this tone generator R0 is terminated by a contagt $lg1$ of a tone interrupting relay LG when this relay is operated consequent on the operation of the talk/listen key of the called extension. Also when the relay LG is operated, further contacts $lg2$ and $lg3$ thereof disconnect the tone generator R0 from the line wires of the line L.

Consider now the operations which take place when a particular near-end extension, say Ext. 1 to which the relay 1R pertains, wishes to call the far-end Ext. 2 to which the relay 2S pertains. The call is initiated by the operation of the push-button switch corresponding to this far-end extension in the calling near-end extension, thereby closing the contacts $1e2$ and $1e2'$. Contact $1e2$, on closure, completes an energizing circuit for the relay 1R between negative (−) and positive (+) terminals of a suitable supply source over the path: negative (−) supply terminal, the energizing winding of relay 1R, the contact $1e2$ (operated), a make-before-break contact $1r1$ (unoperated) of relay 1R, a series chain of normally-closed contacts $1r2$, $2r2$, . . . $nr2$ (unoperated) of the relays 1R, 2R, . . . NR, respectively, a normally-close contact $lx1$ of the release relay LX of the 2 kc.s. tone detector D2, a normally-closed contact $lw4$ of the homing guard relay LW, the wiper of contact arc U1/1, the home contact of the arc U1/1, the home contact of contact arc U3/3, the wiper of contact arc U3/3, to positive (+) supply terminal. A similar energizing circuit for the relay 2S is completed by closure of the contact $1e2'$, but over a path which includes, instead of the relay contact chain $1r2$, $2r2$, . . . $nr2$, a further series chain of normally-closed contacts $1s2$, $2s2$, . . . $ms2$ (unoperated) of the relays 1S, 2S, . . . MS, respectively. When relay 1R operates, its contact $1r1$ establishes a holding circuit for this relay directly to another positive (+) terminal of the supply source, and its contact $1r2$ breaks the connection through the series chain of relay contacts including it, thereby preventing any of the relays pertaining to the other near-end extensions from being operated. A further normally-open contact $1r3$ of the relay 1R closes to connect the wiper of the contact arc U3/3, and thus the positive (+) supply terminal to which this wiper is connected, to the home contact of the contact arc U2/1: this completes a holding circuit for the relay 2S by way of its make-before-break contact $2s1$ which is now operated. Also, an energizing circuit is completed for the detector guard relay LY over a first winding $l1$ thereof, and an energizng circuit is completed for the impulsing relay LU by way of the wiper of contact arc U2/1, a resistance $Rs1$, the energizing winding of the relay LU and the interrupter contacts $mu2$ controlled in known manner by the electromagnet MU2. Contacts $1r4/1r5$ of the relay 1R connect the loudspeaker/microphone device LM1 of the calling extension to the amplifier A, and contact $1r6$ renders effectual the extension's talk/listen key $1k$.

When the relay LY operates its two normally-closed contacts $ly1$ and $ly2$ open to disconnect the detector drive circuit DD from the wires of the line L. When the relay LU operates, its two changeover contacts $lu1$ and $lu2$ disconnect the amplifier A from the wires of the line L and instead connect to these wires the 1 kc.s. oscillator O1, and its changeover contact $lu3$ removes from the oscillator O1 an inhibiting potential (+) applied to it over a lead $hl1$, and instead completes an energizing circuit for the electromagnet MU2. With its inhibiting potential thus removed, and with a suitable energizing source connected to it from terminal $s1$ by way of a normally-open but now operated contact $1r7$ of the relay 1R, the oscillator O1 produces the 1 kc.s. frequency tone and applies it to the line L over contacts $lu1$, $lu2$.

Upon energization of the electromagnet MU2 the interrupter contacts $mu2$ controlled thereby open and interrupt the energizing circuit for the relay LU, which thereupon releases. In turn, the changeover contact $lu3$ interrupts the energizing circuit for the electromagnet MU2 and re-applies the inhibiting potential to the oscillator O1, which also becomes disconnected from the line L at contacts $lu1$, $lu2$. Consequently application of the 1 kc.s. frequency tone to line L ceases. Thus for the period that the relay LU is operated a burst of 1 kc.s. frequency tone is transmitted over the line L to the other end thereof. As a consequence of the energization and subsequent release of the electromagnet MU2, the uniselector switch (U2) has stepped one step to a position in which each wiper of this switch is now in engagement with the first off-normal contact of its associated contact arc U2/1, U2/2 or U2/3, as the case may be. In this position of the switch (U2), an energizing circuit is completed by way of the first off-normal contact and wiper of the contact arc U2/2 for the electromagnet MU1 of the uniselector switch (U1), and the energizing circuit for the relay LU is re-established by way of the first off-normal contact and wiper of the contact arc U2/1. A second operation and release sequence of the relay LU then ensues, resulting in a further burst of 1 kc.s. frequency tone being applied to the line L, and in the stepping of the uniselector switch (U2) another step. As soon as the wiper of the contact arc U2/2, as a result of this step, moves from engagement with the first off-normal contact and engages the second off-normal contact of this arc, the energizing circuit for the electromagnet MU1 is interrupted, and instead a circuit is completed for lighting extension lamps $Ls1$, $Ls2$, . . . $Isn$ (shown in the chain-dotted rectangle CH5) pertaining respectively to the near-end extensions. The lighting of these lamps gives an indication in each near-end extension that the line L is in use, the circuit for these lamps being maintained on any further stepping of the uniselector switch (U2) by reason that all succeeding off-normal contacts of the contact arc U2/2 are commoned to its second off-normal contact. The release of the electromagnet MU1 has resulted in the uniselector switch (U1) being stepped one step into its first off-normal position, where it remains irrespective of further stepping of switch (U2). There is established by way of the wiper and the first off-normal contact of the contact arc U1/2, a holding circuit for the relay LY over a second winding $l2$ thereof. This holding circuit, which, by reason of the commoning of all the off-normal contacts of the contact arc U1/2, is itself interrupted only when the uniselector switch (U1) is restored to its normal position, serves to maintain the relay LY operated irrespective of any subsequent interruption of its original energizing circuit.

With the wiper of the contact arc U2/1 now in engagement with the second off-normal contact of this arc the energizing circuit for the relay LU is again re-established, this time by way of a normally-closed contact *1s3* (unoperated) of the far-end extension relay 1S and therefore a third operation and release sequence of the relay LU ensues, likewise resulting in the application of a further burst of 1 kc.s. frequency tone to the line L and in the stepping of the uniselector switch (U2) a further step. This stepping action continues until the wiper of the contact arc U2/1 reaches an off-normal contact at which it cannot re-establish the energizing circuit for the relay LU by reason that the far-end extension relay contact in series therewith is open. In the present instance, the relay 2S has been operated and contact *2s3* is therefore open. The stepping action is therefore terminated after there has been transmitted over the line L a number of bursts of 1 kc.s. frequency tone which is determined by the particular far-end extension relay which has been operated (in this instance relay 2S), and which is therefore indicative of the particular far-end extension which is being called. It may be noted here that the number of pulses (bursts of 1 kc.s. tone) is in fact one greater than the called extension number. The impulsing rate of the impulsing relay LU may be determined by the resistance R*s1* connected in series with the energizing winding of this relay, together with a capacitance C*s1* which shunts the winding. Appropriate selection of the values of these elements R*s1* and C*s1* can give a time constant such that a preferred impulse repetition rate of the relay LU of the order, say, of 5 impulses per second may be obtained.

At the commencement of the impulsing action of the relay LU, which has just been described, a further changeover contact *lu4* interrupts, on the first operation of this relay, the energizing circuit of a normally energized hold-off relay LV which is thereafter maintained released for the period that the relay LU is impulsing. Upon release of the relay LV, a contact *lv1* thereof, which is in fact a normally-open contact but by reason of the normal energized state of the relay LV functions as a normally-closed contact, disconnects an energy supply at terminal *s2* from the amplifier A, thereby ensuring that the amplifier A is not energized, and so preventing it from picking-up switching noises caused by the contacts *lu1* and *lu2*, during the impulsing of the relay LU. As will be described presently, the hold-off relay LV is similarly released to de-energize the amplifier A and also, at further contacts *lv2*—*lv4*, to perform other hold-off actions, in the instance that the main control unit including it is taken into use in respect of a called extension, a changeover contact *lz2* of the selecting relay LZ being operable instead of the contact *lu4* in this latter case.

The hold-off action of the relay LV, in each case, is achieved by means of a delay element comprising two resistances R*s2* and R*s3*, and a capacitance C*s2*. Briefly, the action of this delay element is that the capacitance C*s2* charges relatively slowly through the resistance R*s3* when contact *lu4* or contact *lz2* is unoperated, diverting energizing current from the relay LV while it does so, and rapidly discharges through the resistance R*s2* when the contact is operated, the value of resistance R*s2* being relatively low. The relay LV is therefore rapidly de-energized and released on the first operation of the contact (*lu4* or *lz2*) and thereafter remains unoperated until, at the end of the impulsing of relay LU, or relay LZ as the case may be, the contact finally returns to its unoperated condition and remains in that condition for a period sufficient for the capacitance C*s2* to become charged to an extent such that its shunting action on relay LV no longer prevents this relay from re-operating.

Considering now the actions which take place at the far end of the line L, the equipment there is similar to that at the near end and the drawing can therefore now be referred to as if it related to this far-end equipment, starting again with the equipment in its quiescent condition.

The calling pulses, constituted by the bursts of 1 kc.s. frequency tone incoming over line L from the calling end, are applied by way of the normally-closed contacts *ly1* and *ly2* (unoperated) of the relay LY to the detector drive circuit DD which, after amplifying these pulses, feeds them to the two tone detectors D1 and D2. The detector D1, being the 1 kc.s. tone detector, responds to these pulses and causes impulsing of the selecting relay LZ in sympathy with them. Each time the relay LZ operates, the normally-open contact *lz1* thereof completes an energizing circuit for the electromagnet MU3 of the uniselector switch (U3), so that on each release of the relay LZ, when the contact *lz1* re-opens, this switch (U3) is stepped one step. On the first operation of the relay LZ, the changeover contact *lz2* of this relay interrupts the energizing circuit of the normally energized hold-off relay LV which is thereafter maintained released, in the manner already described, for the period that the relay LZ is impulsing.

Upon release of the relay IV, its contact *lv1* disconnects the energy supply at terminal *s2* from the amplifier A, as aforesaid, while its contact *lv2*, which is also a normally-open contact functioning as a normally-closed contact, disconnects a positive (+) supply terminal from the wiper of the contact arc U3/2. In this instance the contact *lv1* ensures that the amplifier A is not energized during the receipt of the following bursts of 1 kc.s. frequency tone to which it would otherwise unnecessarily respond, and the contact *lv2* ensures that the positive supply terminal is not extended to the off-normal contacts of the contact arc U3/2 during subsequent stepping of the uniselector switch (U3).

The first step of the uniselector switch (U3) brings the wiper of the contact arc U3/3 out of engagement with the home contact of this arc, so that the previously traced energizing circuits for the relays 1R, 2R, . . . NR and 1S, 2S, . . . MS cannot now be established in consequence of an attempt to initiate a call from any extension at this called end of the line L. The engagement of the wiper of contact arc U3/3 with its first off-normal contact, which is commoned with the other off-normal contacts of the arc, extends positive potential from the wiper as an operating signal over contact *lg1* (unoperated) of the tone interrupting relay LG, and a lead *sl*, to initiate operation of the ringing tone generator R0. The ringing tone produced by this generator R0 is not, however, applied to the line L until the end of impulsing of the relay LZ, because of the two further normally-open contacts *lv3* and *lv4* (functioning as normally-closed contacts) of the relay LV connected between the output of the generator R0 and the line wires. The first step of the uniselector switch (U3) also brings the wiper of the contact arc U3/1 into engagement with the first off-normal contact of this arc, so that a circuit is completed for lighting the extension lamps such as L*s1*, L*s2*, . . . L*sn* at the called end, signifying as before that the line is engaged. The other off-normal contacts of the contact arc U3/1 are commoned to the first off-normal contact, so that the circuit for the lamps will be maintained for any off-normal position of the uniselector switch (U3).

The uniselector switch (U3) steps one step for each calling pulse received, and finally comes to rest in the position in which the wiper of the contact arc U3/2 establishes, over the relevant contact of this arc, an alternative energizing circuit for the particular extension relay 1R, 2R, . . . NR which pertains to the called extension, this energizing circuit being completed when the hold-off relay LV subsequently re-operates and re-closes its contact *lv2*. Thus if, as previously considered, the number of calling pulses received from the calling end is three, the wiper of arc U3/2 stops on its third off-normal contact and establishes the alternative energizing circuit for relay 2R, pertaining to Ext. 2 being called. Re-operation of the relay LV also brings about the re-energization of the amplifier A over contact *lv1* and the connection of the ringing tone generator R0 to the wires of the line L at contacts *lv3* and *lv4*. The ringing tone produced by the generator R0 is therefore applied to the line L and is responded to by the amplifier A at each end thereof. At the calling end, the calling extension receives this tone as an indication that the called extension is being "rung," and at the called end the called extension, whose loudspeaker/microphone device (LM2) is now connected to the amplifier A by way of the operated contacts (*2r4* and *2r5*) of the extension relay (2R) now operated there, receives this tone as a calling signal. When the called extension responds to this calling signal by operation of its talk/listen key (*2k*), the relay TL is operated over the energizing circuit completed by way of this key and the operated extension relay contact (*2r6*) in series with it, thereby completing at a normally open contact *tl3* thereof an energizing circuit for the tone interrupting relay LG. When this latter relay operates, its contact *lg1* changes over to terminate the operating signal applied to the tone generator R0 and instead to maintain the energizing circuit for the relay LG independently of the contact *tl3*. Contacts *lg2* and *lg3* open to disconnect the output of the generator R0 from the wires of the line L. The interconnection between the calling and called extension is now established to the exclusion of all other extensions, the equipment at both ends of the line L being held engaged by the calling extension. The only item of equipment which is now connected ot the line L other than the amplifiers A, is the detector drive circuit DD at the called end. This is necessary because the called end must "listen" for the 2 kc.s. releasing tone from the calling end. In order that the detector D2 shall not falsely respond to 2 kc.s. frequency components of A.C. intelligence signals transmitted between the interconnected extensions, there would usually be provided (in a manner not shown) a suitable guard circuit which ensures that this detector responds only to bona fide 2 kc.s. frequency tones. A similar guard circuit may also be provided for the 1 kc.s. detector D1 and, in addition, this latter detector may also be rendered inoperable, whenever any of the extension relays 1R, 2R, . . . NR is operated, by means of a positive inhibiting potential (+) applied to it by way of the relevant extension relay contact *1r8*, *2r8* . . . or *nr8*.

When, at the end of the call, the extension push-button switch at the calling extension is restored to normal consequent upon operation of the cancel button at that extension, the following release operations take place.

At the calling end, in consequence of the release of the extension push-button switch, the two switch contacts *1e2* and *1e2'* re-open and interrupt the holding circuits for the extension relays 1R and 2S, which therefore release. Relay 1R thereupon disassociates the calling extension from the amplifier A by re-opening its contacts *1r4*, *1r5* and *1r6*, while relay 2S by reclosing its contact *2s3*, re-establishes the energizing circuit for the impulsing relay LU, it being appreciated that at the calling end the uniselector switch (U3) has not been moved off-normal so that the wiper of arc U3/3 is still engaging its home contact. The relay LU recommences impulsing, and in the same manner as before steps the uniselector switch (U2) to its home position, where it comes to rest because the energizing circuit of relay LU is there broken by the now open contact *1r3* of relay 1R. With switch (U2) now in its home position, it interrupts at its contact arc U2/2 the circuit for the extension lamps L*s1*, L*s2*, . . . L*sn* at the calling end. During this homing action the impulsing of relay LU again periodically connects the 1 kc.s. oscillator O1 to the wires of the line L, but since contact *1r7* of relay 1R is now open it disconnects the energy supply at *s1* from the oscillator O1 so that the latter is ineffectual at this time. With the wiper of the contact arc U2/3 now in engagement with the home contact of this arc, a homing energizing circuit for the electromagnet MU1 is completed by way of its interrupter contacts *mu1* and the commoned off-normal contacts of the contact arc U1/2. The uniselector switch (U1) is therefore homed to its normal position at which, since the wiper of the contact arc U1/2 no longer engages the commoned off-normal contacts thereof, the homing circuit is interrupted and no further stepping of the switch takes place.

On the first homing step of the uniselector switch (U1), when the wiper of the contact arc U1/3 comes into engagement with the second off-normal contact of this arc, an energizing circuit is completed for the homing guard relay LW. When this relay LW operates, a normally-closed contact *lw4* thereof opens to interrupt what would otherwise be the energizing circuit for the extension relays in the instance that another of the near-end extensions attempts to initiate a call during the homing action. The contact *lw3* of relay LW opens to remove an inhibiting potential normally applied to the 2 kc.s. oscillator O2, thereby allowing this oscillator to produce the 2 kc.s. releasing tone, and the contacts *lw1* and *lw2* change over to connect the output of the oscillator O2 to the wires of the line L so that the 2 kc.s. releasing tone is applied thereto. The homing guard relay LW is maintained operated during homing of the uniselector switch (U1) by reason that all the off-normal contacts of the contact arc U1/3 subsequent to the second off-normal contact arc commoned to this latter contact, and also for a short period subsequent to this homing action by reason of a delay circuit, comprising a capacitance C*s3* and two resistances R*s4* and R*s5*, which delays the release of relay LW after its operating energy has been removed. This latter period is determined by the time constant of these elements C*s3*, R*s4* and R*s5* in respect of the discharge of the capacitance C*s3* through the energizing winding of the relay LW when the energizing circuit for the latter is interrupted, the relay LW being maintained operated for such period by the discharge current. This delayed release of the relay LW ensures that the equipment at the near end has been restored to normal before re-closure of contact *lw4* permits another call to be made from the same end and also ensures that the 2 kc.s. releasing tone is applied to the line L for a sufficient period to ensure restoration to normal of the equipment at the called end of the line.

At the called end the only items of equipment required to be restored to normal are the uniselector switch (U3) and the two relays 2R (pertaining to the called extension) and LG. The 2 kc.s. releasing tone received from the calling end is applied, after amplification by the detector drive circuit DD, to the two tone detectors D1 and D2, of which the detector D2, being the 2 kc.s. tone detector, responds and causes operation of the release relay LX for the period that the tone is being received. When the relay LX operates, its normally-closed contact *lx1* opens to interrupt what would otherwise be the energizing circuit for the extension relays in the instance that an extension at the called end attempts to initiate a call during the releasing action, and its normally-open contact *lx2* closes to complete a homing energizing circuit for the electromagnet MU3 of the uniselector switch (U3) by way of its interrupter contacts *mu3* and the commoned off-normal contacts of the contact arc U3/3. The uniselector switch (U3) is therefore homed to its normal position at which, since the wiper of the contact arc U3/3 no longer engages the commoned off-normal contacts thereof, the homing circuit is interrupted and no further stepping of the switch takes place. In this position of the switch (U3) the holding circuit for the relay LG is interrupted at contact arc U3/3, causing release of this relay, and the circuit for the extension lamps L*s1*, L*s2*, . . . L*sn* is interrupted at arc U3/1. Also, the energizing circuit for the operated extension relay (2R) is interrupted at arc U3/2 on the first homing step of the uniselector switch (U3), thereby causing this relay to release and to dissociate the called extension from the amplifier A at the called end by the re-opening of its contacts $2r4$, $2r5$ and $2r6$. While the uniselector switch (U3) is homing, the contact $lv2$ is closed because the energized state of the hold-off relay LV is unaffected. However, the rate of stepping of this switch (U3) when homing, as compared with its rate of stepping for extension selection as previously described, is such that the contacts of arc U3/2 engaged by the wiper during homing are each so engaged for a time insufficient to result in operation of the extension relays (R) connected to them. When relay LX subsequently releases on cessation of the 2 kc.s. releasing tone and re-closes contact $lx1$, the equipment is again in its normal condition ready for another call.

In carrying out the invention, the oscillators O1 and O2 may be of any suitable form preferably employing transistors, as also may be the detectors D1 and D2, and the detector drive circuit DD, while the reversible amplifier A may be of the form described in our copending application No. 22,397/58. The ringing tone generator R0 may also be of any suitable form and in particular may be constituted by two free-running multivibrator circuits of which one, having an operating frequency corresponding to a desired interruption frequency for the ringing tone, periodically inhibits the other, the operating frequency of which produces the required tone. It is not thought necessary in the present state of the art to show detailed circuits for these items of equipment.

What we claim is:

1. For an intercommunication system permitting any one of a number of extensions at one end of a communication path to obtain access over said path to any one of a number of extensions at the other end, apparatus for one end of said path comprising in combination:

a plurality of first switching means pertaining to each of the extensions at said end and each operable for affording access of its extension to the communication path to the exclusion of all other extensions at the same end;

pulse generating means operable to apply a pulse train to the communication path consequent upon operation of a first switching means pertaining to a calling extension at this end;

a plurality of second switching means pertaining one to each extension at the other end of the path;

calling means at each extension for contemporaneously operating the first switching means pertaining to that extension when calling and the particular second switching means which pertains to the extension at the other end which is being called;

pulse determining means controlled by an operated second switching means for determining, according to the particular called extension to which it relates, the number of pulses in a pulse train applied to the communication path by the pulse generating means;

and selecting means for causing selective operation of a particular first switching means independently of said calling means in response to a pulse train received over the communication path from the other end, the number of pulses in such received pulse train identifying a particular extension that is being called by a calling extension at the other end, and the particular first switching means which is caused to be operated by the selecting means being that which pertains to the extension thus identified.

2. Apparatus as claimed in claim 1 comprising a main control unit including said pulse generating means, said pulse determining means, said selecting means and relays constituting said switching means, control connections to this main unit from the several extensions at the same end of the communication path, and calling switches at the individual extensions for controlling said relays over said control connections.

3. Apparatus as claimed in claim 2 wherein the calling switches at each extension relate respectively to the several extensions at the other end of the communication path and each of said switches is operable to establish over the control connections energizing circuits for a first particular relay which relates to its own extension and for a second particular relay which relates to the far-end extension to which the switch relates.

4. Apparatus as claimed in claim 3 wherein said selecting means is operable to selectively operate at its own end, in response to a received pulse train identifying a called extension at that end, the relay which there relates to the called extension.

5. Apparatus as claimed in claim 1 including for its end of the communication path, amplifying means through which, under control of said first switching means, the extensions at that end have common one-at-a-time access to said path.

6. Apparatus as claimed in claim 5 for an intercommunication system providing communication in both directions over the communication path, wherein said amplifying means can function for both transmission and reception and has means for selectively switching it according to the function required of it at any particular time.

7. Apparatus as claimed in claim 1 wherein the pulse generating means comprises a uniselector switch having a self-stepping circuit which is initially established by operation of the first switching means pertaining to any extension and is maintained during stepping by the unoperated second switching means relating to those far-end extensions which precede, in a particular order, a called far-end extension, the stepping of the uniselector switch being accompanied by the application of pulses to the communication path and the operated second switching means relating to the called far-end extension being effective to stop the stepping action after the number of steps for which the number of said pulses is that identifying the called extension.

References Cited in the file of this patent

UNITED STATES PATENTS

| | | |
|---|---|---|
| 2,717,279 | Matlack | Sept. 6, 1955 |
| 2,717,925 | Lomax | Sept. 13, 1955 |
| 2,863,949 | Lomax | Dec. 9, 1958 |
| 2,971,085 | Smith | Feb. 7, 1961 |